Oct. 10, 1944.  G. HOHWART  2,360,059
THREAD PLUG GAUGE WEAR TESTING DEVICE
Filed Dec. 29, 1943  2 Sheets-Sheet 1

INVENTOR.
George Hohwart.
BY
Harness, Dickey & Pierce.
ATTORNEYS.

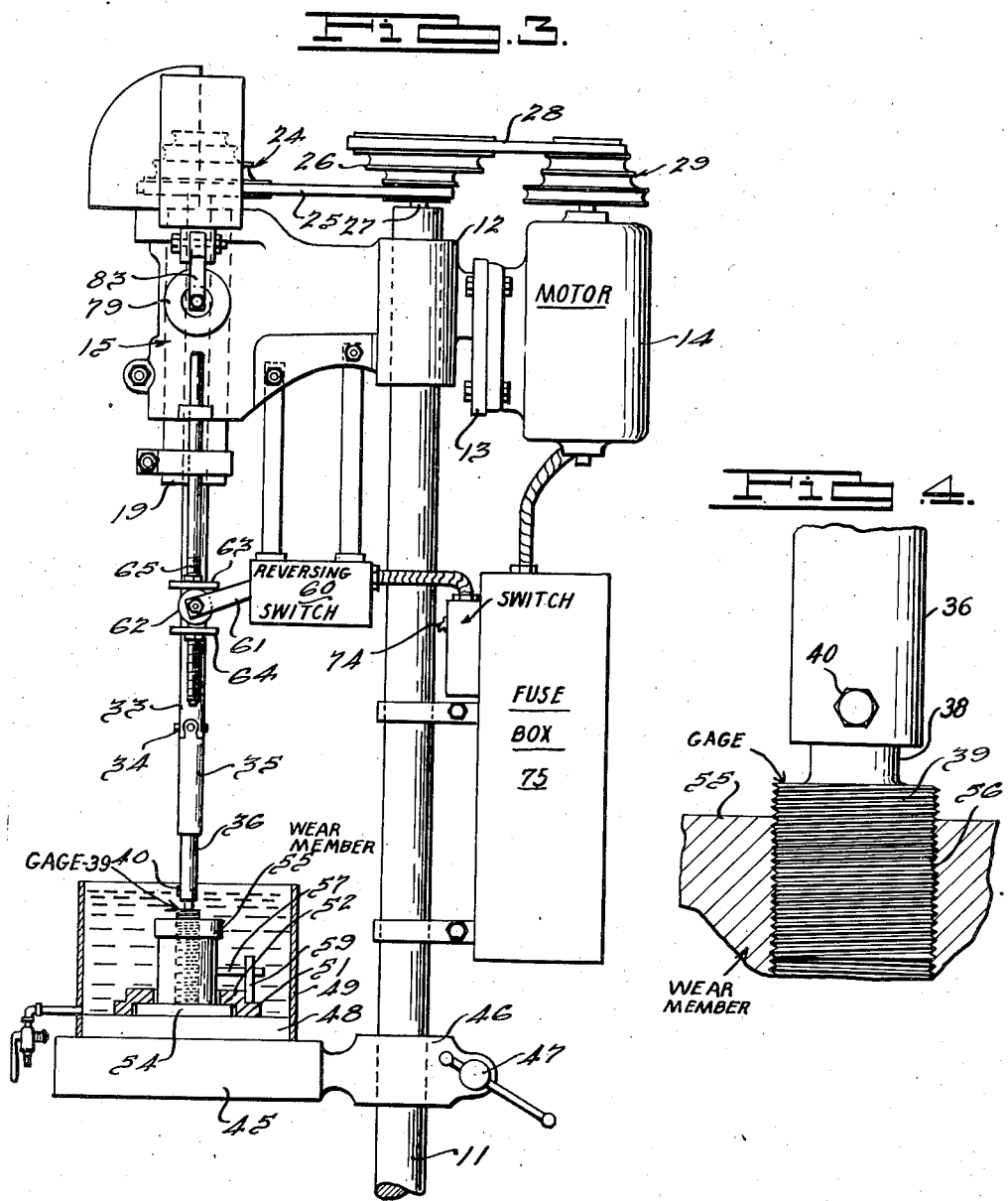

Patented Oct. 10, 1944

2,360,059

UNITED STATES PATENT OFFICE 2,360,059

THREAD PLUG GAUGE WEAR TESTING DEVICE

George Hohwart, Orchard Lake, Mich., assignor to N. A. Woodworth Company, Ferndale, Mich., a corporation of Michigan Application December 29, 1943, Serial No. 516,023

8 Claims. (Cl. 73—7)

The invention relates to wear testing machines and it has particular relation to a mechanism for testing the wear qualities of a threaded gauge member.

In the use of threaded gauge members, as for example, cylindrical thread plug gauges and the plug members thereof where formed separately from the handle, it is desirable to know the wear qualities of the gauge as this enables both the manufacturer and the user to determine the expected life of the gauge and to determine error in accuracy that may occur during use. Furthermore, it is important for the manufacturer to know the wearing qualities as this promotes improvements particularly in the selection of metals whose wearing qualities may vary. Tests to determine the wearing qualities should, as nearly as possible, approximate wear conditions prevailing in actual use of the gauges while at the same time it is important that such tests be of accelerated character as compared to the wear that occurs in actual use.

One object of the present invention is to provide a testing machine for testing the wearing qualities of a cylindrical thread gauge member which will obtain conditions approximating those existing during actual use of the gauge members and which will effect the tests in an accelerated manner.

Another object of the invention is to provide a mechanism such as mentioned wherein the wear means acting on the threads may be adjusted so as to secure the desired wearing condition.

Another object of the invention is to provide a wear testing mechanism of the type mentioned which is automatic so that once a test is initiated, it may be continued for any length of time desired.

Other objects of the invention will become apparent from the following description, from the drawings to which it relates and from the claims hereinafter set forth.

For a better understanding of the invention reference may be had to the accompanying drawings wherein:

Figure 3 is an elevational view of the mechanism as seen from the right side in Figure 2.

Figure 4 is a detailed view on a larger scale and partly in cross-section showing the relation between the threaded gauge member and the threaded plug wear member used in the mechanism.

Figures 1, 2:
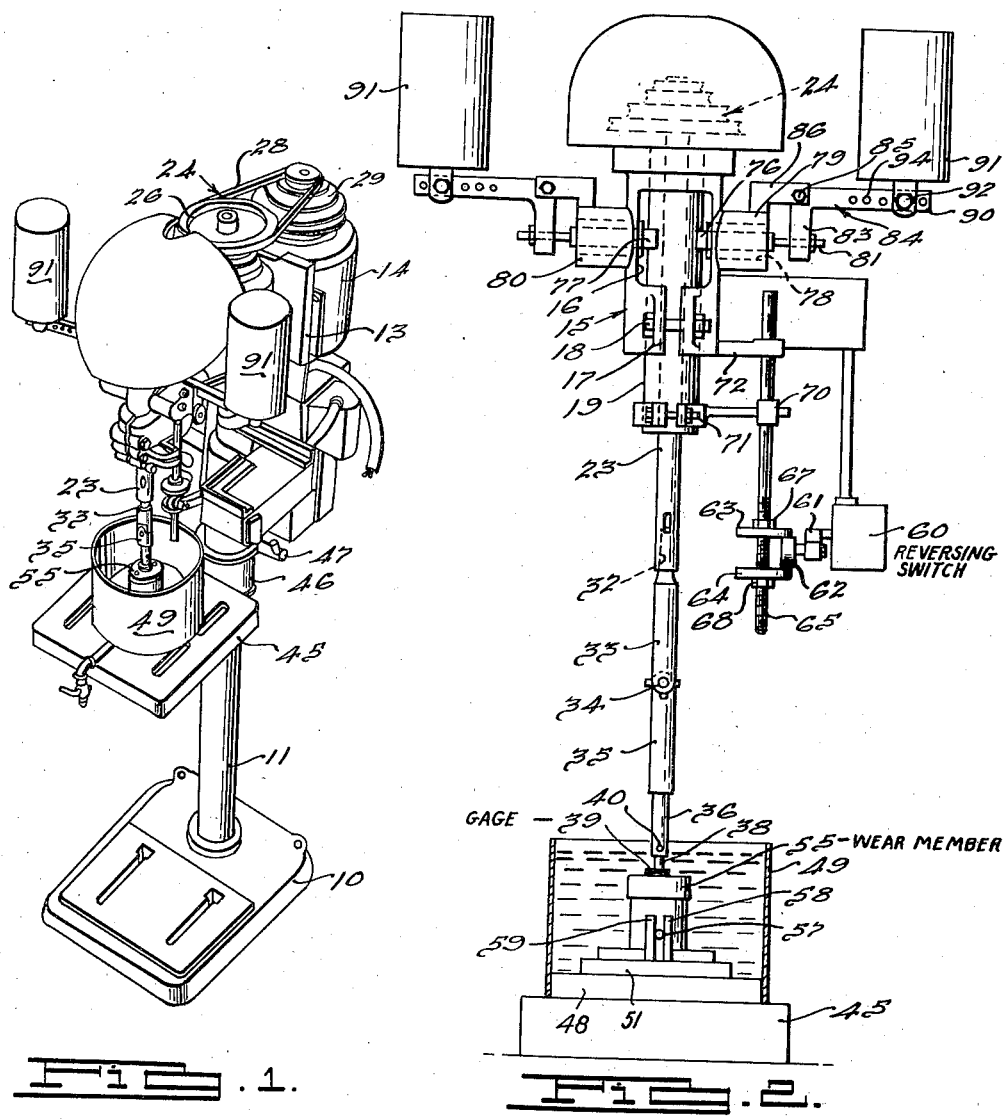
Figure 1 is an elevational view in perspective illustrating a testing mechanism constructed according to one form of the invention.
Figure 2 is an elevational view of the mechanism shown by Figure 1 as seen from the front side thereof, with certain parts removed or in section for the purpose of clarity.

Referring to Figures 1, 2 and 3, the base of the machine is indicated at 10 and is shown as having a vertical column 11 projecting thereabove and which supports the operating parts of the mechanism. This column, at its upper end, as best shown by Figure 3, has a frame or bracket 12 fastened thereto, and the bracket at one side has a plate portion 13 to which a reversible motor 14 is secured. At the opposite side of the column, the bracket 12 has a tubular portion 15, which, as best shown by Figure 2, has a transverse and rather wide opening 16 intermediate its ends. The lower end of the tubular portion 15 is bifurcated as indicated at 17 and the bifurcated portions are adapted to be drawn towards each other by a clamping bolt 18. A quill 19 projecting upwardly into the bifurcated end of the tubular part 15 is held closely and slidably by adjustment of the clamping action of the bifurcated parts.

The quill 19 rotatably receives therein and holds against relative axial movement a spindle 23 projecting upwardly at a point above the upper end of the tubular part 15 and at such upper end, the spindle has a multiple groove pulley 24 splined thereto. A belt 25, trained about this pulley, engages a groove of a second multiple groove pulley 26 which is fastened to a shaft 27 rotatable in the upper end of the column 11. A second belt 28 engaging the pulley 26 in turn engages a third multiple groove pulley 29 fastened to the shaft of the motor 14. From this it will be apparent that operation of the motor will effect rotation of the spindle 23 while at the same time allowing the spindle and quill to move upwardly and downwardly due to the splined connection between pulley 24 and the spindle.

The spindle 23 at its lower end has a tapered drill socket 32 which receives the tapered upper end of a shaft element 33 and the latter in turn is connected by means of a universal joint 34 to a lower shaft element 35 having a tubular extension 36 at its lower end. Such lower end 36 of the shaft 35 is adapted to receive the shank 38 of a cylindrical thread plug gauge 39 and such shank may be locked in place by means of a set screw 40. As defined in the edition entitled "Gage blanks," Commercial Standard CS8–41, promulgated by the U. S. Department of Commerce and effective as of January 1, 1941, a thread plug gauge is defined as follows: A "thread plug gauge is a complete internal thread gauge of either single or double-ended type, comprising handle and threaded gauging member or members, with suitable locking means." The usual thread plug gauge comprises a handle in one, and usually in both ends of which, a gauging member is removably received. These gauging members are usually, but not always, made up of a cylindrical body which is externally threaded, such as the body 39, and an integral tapered shank, such as the shank 38, adapted to be received in a complementary opening in the end of the gauge handle (not shown) and held therein by friction. This type of cylindrical plug gauge member is shown in the drawing by way of illustration and not by limitation. Such gauge members are adapted to be employed to test the sizes of threaded holes in workpieces and to this end, in a double-ended cylindrical thread plug gauge, the gauging member at one end of the handle is of a size complementary to the smallest threaded hole acceptable for the workpiece, and the gauging member at the opposite end of the handle is of a size such, that if capable of being threaded into the threaded hole, indicates that the hole is too large to be acceptable.

At a point above the base 10, an ordinary drill table or supporting plate 45 is adjustably secured to the column 11 by means of a bifurcated part 46 and a clamping screw 47. This table 45 has, upon its upper side, a smaller circular plate portion 48 and a pan or receptacle 49 which fits this plate portion so as to receive a coolant. Within the receptacle 49 a ring 51 is fastened to the plate portion 48 by suitable means such as bolts and this ring has an overhanging rim 52 (see Fig. 3) which engages the marginal portion of the base 54 of a wear member 55. It is to be noted that the base 54 can shift laterally within a small range of movement but that vertical movement is substantially prevented. In order to prevent turning of the wear member, a pin 57 projects therefrom and between two fingers 58 and 59 projecting upwardly from the ring 51. This finger engagement permits lateral shifting of the wear member but the engagement is such as to substantially prevent any turning movement of the wear member.

The wear member, as best shown by Figure 4, is in the form of a block having a threaded opening 56 which is adapted to receive the threaded portion of the plug gauge 39. While the block may be formed of any desired material, and may be formed of the same kind of material as the thread gauge will be used in connection with in service, it is usually preferable to form it of cast iron. The tank 49 is of such depth that coolant may be placed therein to a depth above the threads. In operation, it is desired that the plug gauge advance into the wear member 55 until fully threaded thereinto and then that the rotation of the gauge be reversed so that it will thread itself out of the wear member, excepting for a final thread engagement of one or two threads and that then the gauge member be again reversed in rotation so as to again advance into the wear member. This repeated reversal of operation is to be continued for a desired length of time and in order to effect the reversal, means are provided for reversing the motor 14 at desired times.

The reversing means provided, as best shown by Figures 2 and 3, comprises a reversing switch 60 having a switch arm 61 provided with a roller 62. This roller is disposed between a pair of collars 63 and 64 threaded onto a vertical rod 65 and the collars are locked in adjusted position by lock nuts 67 and 68. The rod 65 is adjustably secured to a hanger 70 having a bifurcated end 71 adjustably clamped about the lower end of the quill 19 while the upper end of the rod is slidable through an opening in a stationary arm 72. A manual control switch 74 may be provided for stopping and starting the motor, it being shown as mounted on a fuse box 75. It should be understood now that upon a predetermined movement downwardly of the spindle and quill caused by threading of the gauge member 39 into the wear member 55, the switch 60 will be operated to reverse the motor and then upon a predetermined upward movement of the spindle caused by reversed threading action, the switch will be reversely operated to again reverse the motor. This reversal is continuous as long as the control switch 74 is closed. It is manifest that the collars 63 and 64 may be adjusted so as to effect reversal of the motor at the desired time. The movability of the wear member allows it to float laterally within limits and there is sufficient tolerance to permit the wear member to tilt slightly, and this in conjunction with the joint 34, insures axial alignment of the wear member with the plug gauge.

For the purpose of providing resistance to axial movement of the plug gauge, so as to produce a desired degree of friction between the threads, both when the gauge member 39 is moving downwardly and when it is moving upwardly, frictional elements 76 and 77 are provided which engage opposite sides of the quill 19 in the open space 16 of the tubular part 15. These elements comprise brass rods having their inner ends curved to fit the opposite sides of the quill surface. Each rod is slidable in a sleeve bearing 78 and the bearings are located in tubular extensions 79 and 80 on diametrically opposite sides of the tubular part 15. Each of the rods 76 and 77 is urged inwardly by a screw 81 adjustably threaded through an arm 83 of a bell crank 84 pivoted as indicated at 85 to an angular portion 86 on the tubular extension 79 or 80 as the case may be. The other arm of the bell crank indicated at 90 supports a weight 91 and this weight may be adjustably positioned along the arm 90 by means of a bolt 92 adapted to selectively extend through a series of openings 94 in the arm. From this, it will be appreciated that the pressure of the brass rods 76 and 77 against the quill may be varied.

In testing one of the thread plug gauges disposed in position as shown, coolant such as distilled water is provided in the tank 49, as indicated previously, and, after adjusting the parts as desired, the control switch 74 is closed. The thread plug gauge then rotates first in one direction and then in the other so as to first thread itself into the wear member and then to thread itself almost out of the wear member. As this occurs, the resistance elements 76 and 77 resist the axial movement of the quill and consequently when the plug gauge reverses in rotation, it must climb the threads of the wear member against substantial axial resistance. This holds true in the downward movement of the plug gauge, but in this instance the opposite sides of the threads must pull the gauge into the wear member. While this wear action is desirable, the use of coolant is preferred in order to eliminate the effects of heat or, in other words, it is desirable to rapidly thread the plug gauge into and out of the wear members in order to accelerate the wear action, while at the same time to avoid the effect of heat, since in normal use, heat will not normally play any part in the wearing of a plug gauge.

Although only one form of the invention has been illustrated and described in detail, it will be apparent to those skilled in the art that various modifications may be made without departing from the scope of the appended claims.

What is claimed is:

1. A wear testing mechanism for testing a threaded gauge member, comprising a support, a wear member having threads for engaging the threads on the gauge member, power driven means for rotating the members relatively so as to advance one over the threads of the other solely through interengagement of the thread thereof, and means operable to automatically effect regular reversal in relative rotation so as to repeatedly thread the members one over the other first in one direction and then in the other.

2. A wear testing mechanism for testing a threaded gauge member, comprising a support, a wear member having threads for engaging the threads on the gauge member, power driven means for rotating the members relatively so as to advance one over the threads of the other, means operable to automatically effect regular reversal in relative rotation so as to repeatedly thread the members one over the other first in one direction and then in the other, and adjustable means for applying resistance to relative axial movement of the members so as to increase the friction between the threads.

3. A wear testing mechanism for testing a threaded gauge member, comprising a support, a wear member having threads for engaging the threads of the gauge member, a reversible electric motor for rotating the members relatively so as to advance one over the threads of the other solely through interengagement of the threads thereof, and means operable to automatically effect regular reversal of said motor at predetermined relative axial positions of said members so as to repeatedly thread the members one over the other first in one direction and then in the other and to effect such reversal without disengaging the threaded members.

4. A wear testing machine for testing a threaded gauge member comprising a support, a rotary shaft on said support and mounted for reciprocation along its axis, means for driving the shaft, a threaded wear member on the support at one end of and aligned with the shaft, a threaded gauge member on said end of the shaft and adapted to be threaded into the first member, and automatic means for effecting reversal in rotation of said shaft after the gauge member advances on the wear member a certain distance and for again reversing rotation of the shaft before the gauge member can disengage from the wear member.

5. A wear testing machine for testing a threaded gauge member comprising a support, a rotary shaft on said support and mounted for reciprocation along its axis, means for driving the shaft, a threaded wear member on the support at one end of and aligned with the shaft, a threaded gauge member on said end of the shaft and adapted to be threaded into the first member, means for effecting reversal in rotation of said shaft after the gauge member advances on the wear member a certain distance and for again reversing rotation of the shaft before the gauge member can disengage from the wear member, and means for applying frictional resistance to axial movement of the shaft so as respectively to create wear pressure on opposite sides of the threads during rotation of the gauge in both directions.

6. A wear testing machine for testing a threaded gauge member comprising a support, a rotary shaft on said support and mounted for reciprocation along its axis, means for driving the shaft, a threaded wear member on the support at one end of and aligned with the shaft, a threaded gauge member on said end of the shaft and adapted to be threaded on the first member, means for effecting reversal in rotation of said shaft after the gauge member advances on the wear member a certain distance and for again reversing rotation of the shaft before the gauge member can disengage from the wear member, and means for applying frictional resistance to axial movement of the shaft so as respectively to create wear pressure on opposite sides of the threads during rotation of the gauge in both directions, said last mentioned means comprising a sliding pin on the support pressing at one end against the shaft, a lever pivoted on the support and pressing against the other end of the pin, and a weight for swinging the lever.

7. A wear testing machine for testing a threaded gauge comprising a support, a rotary shaft on said support and mounted for reciprocation along its axis, means for driving the shaft, a threaded wear member on the support at one end of and aligned with the shaft, a threaded gauge member on said end of the shaft and connected thereto by means including a universal connection, and means for automatically effecting reversal in rotation of the shaft after the gauge member advances in the wear member a certain distance solely through interengagement of the threads of said members and for again reversing rotation of the shaft before the gauge member is disengaged from the wear member.

8. A wear testing machine for testing a threaded gauge comprising a support, a rotary shaft on said support and mounted for reciprocation along its axis, means for driving the shaft, a threaded wear member on the support at one end of and aligned with the shaft, a threaded gauge member on said end of the shaft and connected thereto by means including a universal connection, means for automatically effecting reversal in rotation of the shaft after the gauge member advances on the wear member a certain distance and for again reversing rotation of the shaft before the gauge member can disengage from the wear member, and means mounting the wear member on the support so that it can float within limits to align itself with the gauge member.

GEORGE HOHWART.

CERTIFICATE OF CORRECTION.

Patent No. 2,360,059.

October 10, 1944.

GEORGE HOHWART.

It is hereby certified that error appears in the printed specification of the above numbered patent requiring correction as follows: Page 1, second column, lines 5 and 6, for the words "threaded gauge member and the threaded plug wear member" read --thread plug gauge member and the threaded wear member--; page 3, first column, line 22, claim 1, for "thread" read --threads--; and that the said Letters Patent should be read with this correction therein that the same may conform to the record of the case in the Patent Office.

Signed and sealed this 20th day of March, A. D. 1945.

Leslie Frazer
Acting Commissioner of Patents.

(Seal)